US012598632B2

(12) United States Patent
Gandhi et al.

(10) Patent No.: US 12,598,632 B2
(45) Date of Patent: Apr. 7, 2026

(54) AVOIDING CELLULAR CO-EXISTENCE INTERFERENCE IN A WI-FI NETWORK

(71) Applicant: Cisco Technology, Inc., San Jose, CA (US)

(72) Inventors: Indermeet S. Gandhi, San Jose, CA (US); Jerome Henry, Pittsboro, NC (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 608 days.

(21) Appl. No.: 18/149,529

(22) Filed: Jan. 3, 2023

(65) Prior Publication Data

US 2024/0015776 A1      Jan. 11, 2024

Related U.S. Application Data

(60) Provisional application No. 63/367,984, filed on Jul. 8, 2022.

(51) Int. Cl.
| | |
|---|---|
| *H04W 72/541* | (2023.01) |
| *H04W 72/04* | (2023.01) |
| H04W 84/12 | (2009.01) |

(52) U.S. Cl.
CPC ......... *H04W 72/541* (2023.01); *H04W 72/04* (2013.01); *H04W 84/12* (2013.01)

(58) Field of Classification Search
CPC .... H04W 72/541; H04W 72/04; H04W 84/12
See application file for complete search history.

(56) References Cited

U.S. PATENT DOCUMENTS

| | | | | |
|---|---|---|---|---|
| 8,340,580 | B1 * | 12/2012 | Epstein | .................. H04B 1/406 |
| | | | | 455/73 |
| 9,407,302 | B2 * | 8/2016 | Schmidt | .............. H04L 25/0204 |
| 9,706,469 | B2 * | 7/2017 | Himayat | .......... H04W 28/0846 |
| 9,756,611 | B2 * | 9/2017 | Yavuz | ................... H04W 72/02 |
| 10,524,148 | B2 * | 12/2019 | Sadek | ................... H04W 16/14 |
| 10,743,328 | B2 * | 8/2020 | Kenkel | ................ H04W 72/56 |
| 2011/0256834 | A1 | 10/2011 | Dayal et al. | |
| 2012/0087341 | A1 * | 4/2012 | Jang | .................... H04W 36/302 |
| | | | | 455/501 |
| 2014/0342745 | A1 * | 11/2014 | Bhushan | ............. H04L 27/0006 |
| | | | | 455/450 |
| 2015/0065157 | A1 | 3/2015 | Homchaudhuri et al. | |

(Continued)

OTHER PUBLICATIONS

"Wi-Fi/Cellular Coex Channel Avoidance," source.android.com, dated: Oct. 11, 2022, pp. 1-20.

*Primary Examiner* — Bailor C Hsu
(74) *Attorney, Agent, or Firm* — Patterson + Sheridan, LLP

(57) ABSTRACT

Techniques for wireless communications are disclosed. These techniques include identifying a change in at least one of: (i) a WiFi radio channel or (ii) a cellular radio channel for a wireless station (STA) supporting both WiFi and cellular radio access technologies. The techniques further include determining one or more WiFi radio channels subject to interference from the cellular radio for the STA, based on a network message received from the STA, and modifying one or more parameters for WiFi communication relating to the STA, based on the determined one or more WiFi radio channels subject to interference.

17 Claims, 6 Drawing Sheets

(56)     References Cited

U.S. PATENT DOCUMENTS

| | | | |
|---|---|---|---|
| 2015/0223243 A1* | 8/2015 | Tabet | H04L 5/0073 |
| | | | 370/330 |
| 2015/0319658 A1* | 11/2015 | Padden | H04W 28/0861 |
| | | | 455/436 |
| 2017/0201997 A1* | 7/2017 | Cheng | H04W 72/541 |
| 2017/0359300 A1* | 12/2017 | Patil | H04W 52/0212 |
| 2017/0366990 A1 | 12/2017 | Emmanuel et al. | |
| 2020/0015089 A1 | 1/2020 | Lin et al. | |
| 2020/0107214 A1 | 4/2020 | Vlachou et al. | |

* cited by examiner

AVOIDING CELLULAR CO-EXISTENCE INTERFERENCE IN A WI-FI NETWORK

CROSS-REFERENCE TO RELATED APPLICATIONS

This application claims benefit of U.S. provisional patent application Ser. No. 63/367,984 filed Jul. 8, 2022. The aforementioned related patent application is herein incorporated by reference in its entirety.

TECHNICAL FIELD

Embodiments presented in this disclosure generally relate to wireless communications. More specifically, embodiments disclosed herein relate to avoiding interference between cellular and WiFi communication.

BACKGROUND

For devices with cellular technologies such as LTE, 5G New Radio (NR), 5G New Radio Unlicensed (NR-U) and Licensed Assisted Access (LAA), the cellular channels in use can interfere with a WiFi channel in use. This occurs, for example, when the cellular and WiFi channels are within short frequency separation (neighboring channels) or when there is harmonic and intermodulation interference. This is becoming more and more of a problem as cellular-based systems relying on unlicensed bands are fast developing, and the resulting interference can be severe.

For example, this type of interference is common where clients concurrently receive signals from both technologies. The issue also becomes a particularly severe problem for individual clients when one antenna is transmitting (e.g. an NR-U signal), and another is receiving at the same time signal from the competing technology (e.g. WiFi). In this case, the transmitting antenna floods the receiving antenna, impacting its reception quality, even if the client is intended to support both technologies concurrently.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
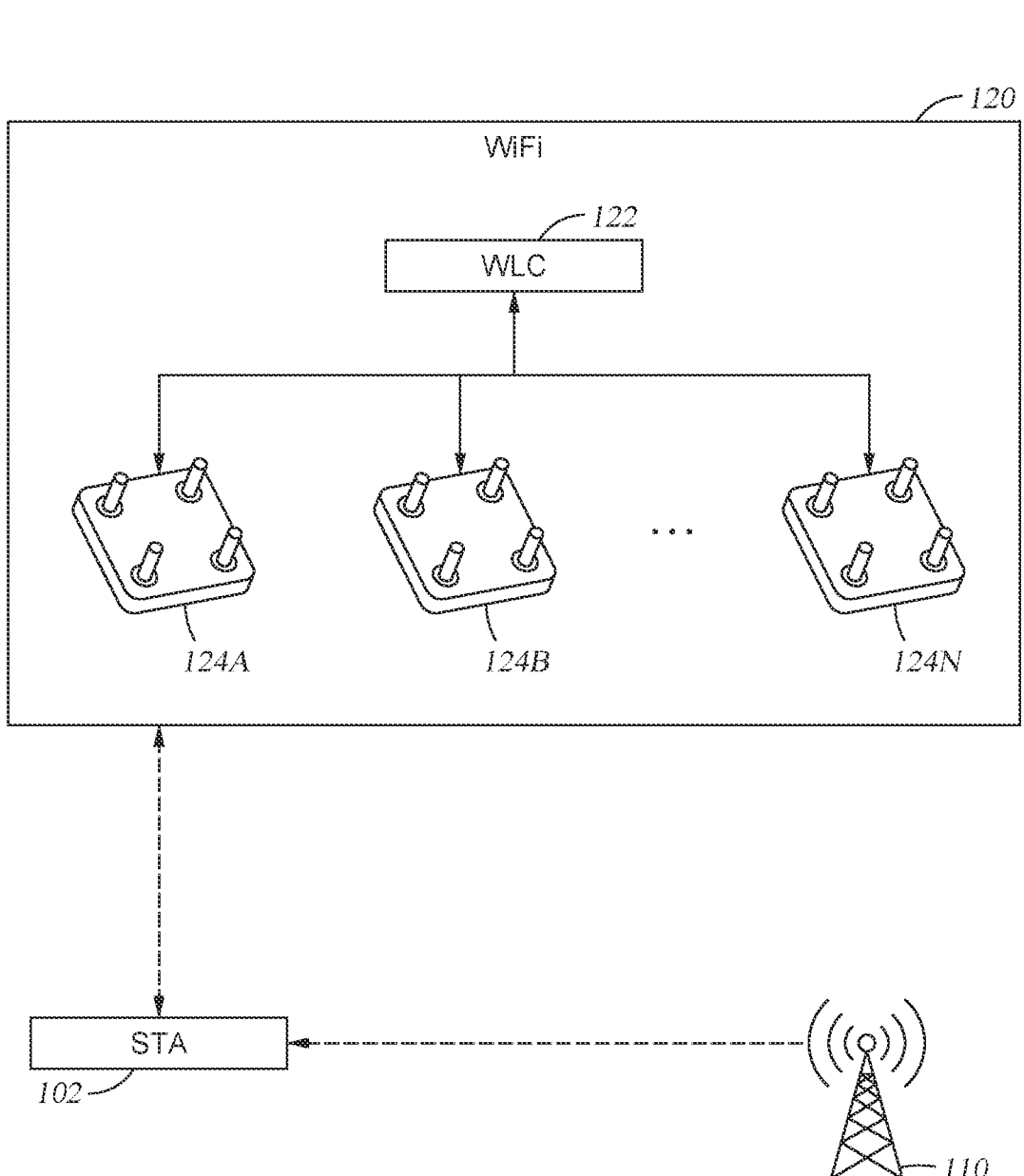
FIG. 1 illustrates a computing environment for avoiding cellular coexistence interference in a WiFi network, according to one embodiment.

Embodiments include a method. The method includes identifying a change in at least one of: (i) a WiFi radio channel or (ii) a cellular radio channel for a wireless station (STA) supporting both WiFi and cellular radio access technologies. The method further includes determining one or more WiFi radio channels subject to interference from the cellular radio for the STA, based on a network message received from the STA. The method further includes modifying one or more parameters for WiFi communication relating to the STA, based on the determined one or more WiFi radio channels subject to interference.

Embodiments further include a system. The system includes a processor, and a memory having instructions stored thereon which, when executed on the processor, performs operations. The operations include identifying a change in at least one of: (i) a WiFi radio channel or (ii) a cellular radio channel for an STA supporting both WiFi and cellular radio access technologies. The operations further include determining one or more WiFi radio channels subject to interference from the cellular radio for the STA, based on a network message received from the STA. The operations further include modifying one or more parameters for WiFi communication relating to the STA, based on the determined one or more WiFi radio channels subject to interference.

Embodiments further include a non-transitory computer-readable medium having instructions stored thereon which, when executed by a processor, performs operations. The operations include identifying a change in at least one of: (i) a WiFi radio channel or (ii) a cellular radio channel for an STA supporting both WiFi and cellular radio access technologies. The operations further include determining one or more WiFi radio channels subject to interference from the cellular radio for the STA, based on a network message received from the STA. The operations further include modifying one or more parameters for WiFi communication relating to the STA, based on the determined one or more WiFi radio channels subject to interference.

Example Embodiments

As discussed above, interference between cellular communications and WiFi channels is an increasing problem. A wireless access point (AP) can in some cases detect the presence of interfering technology. But in many cases, the AP is not able to readily detect the interference because it does not have the same view as the client wireless station (STA). Additionally, coexistence technologies are expected to be in place, and the WiFi infrastructure has no knowledge that the cellular transmission is causing interference at the STA. As most of the traffic indoors is on WiFi, the user experience on voice or video call suffers.

In an embodiment, this interference can be mitigated by identifying unsafe WiFi channels (e.g., WiFi channels at risk for interference from cellular communication) and coordinating WiFi transmission to avoid the unsafe channels. In a given area, cellular systems typically do not hop around channels. They pick a set and use it until their own interference algorithm decides to change channels. Therefore, an STA can detect a list of unsafe WiFi channels and report them to a WiFi AP. The WiFi APs, or an associated controller, can then choose cellular interference free channels. This is discussed further, below, with regard to FIGS. 3-5.

FIG. 1 illustrates a computing environment 100 for avoiding cellular coexistence interference in a WiFi network, according to one embodiment. In an embodiment, an STA 102 supports both cellular and WiFi radio access technologies (e.g., the STA 102 is capable of communication over both cellular and WiFi communication networks). For example, the STA 102 can communicate with a cellular base station 110 for communication over a cellular network. The STA 102 can communicate with a WiFi deployment 120 for WiFi communication.

The cellular base station 110 can be any suitable cellular base station, including a 5G cellular base station (e.g., supporting 5G NR-U) or any other suitable cellular base station. Further, while the cellular base station 110 is illustrated as a base station, this is merely an example. The STA 102 can interact with any suitable cellular component. The STA 102 can be any suitable wireless device (e.g., an Internet of Things (IoT) device, smartphone, tablet, laptop computer, wearable device, or any other suitable wireless device). Further, the STA 102 can include any suitable number of wireless antennas used for any suitable radio access technologies (e.g., multiple antennas used for WiFi and cellular radio access technologies).

The WiFi deployment 120 can operate using any suitable WiFi communication standard (e.g., an 802.11 standard) and can include a wireless local area network (WLAN) controller (WLC) 122. The WiFi deployment further includes a number of APs 124A-N, each of which is associated with one or more STAs. For example, the STA 102 can be associated with an AP 124A, which is controlled using the WLC 122. This is merely an example, and the WiFi deployment 120 can include any suitable WiFi networking components.

In an embodiment, the cellular base station 110 operates in a cellular channel that causes interference with WiFi communication for the STA 102. This is illustrated further, below, with regard to FIG. 5. For example, the cellular base station 110 can operate using 5G NR-U which can interfere with simultaneous WiFi communication for the STA 102.

In an embodiment, the STA 102 detects the interference and identifies unsafe WiFi communication channels (e.g., WiFi channels subject to the cellular interference). The STA 102 can check whether the WiFi deployment 120 supports reporting of unsafe WiFi channels, and if so the STA 102 can report the unsafe channels to the WiFi deployment 120. This is discussed further, below, with regard to FIG. 3. The WiFi deployment 120 (e.g., the WLC 122, one of the APs 124A-N, or any other suitable component) can use the reported unsafe channels to modify the channels used for WiFi operation to reduce interference with the cellular base station 110. This is discussed further, below, with regard to FIGS. 4A-D. Further, in an embodiment the WiFi deployment 120 (e.g., one of the APs 124A-N) can periodically collect unsafe channel information from STAs, and when cellular channels are changed (e.g., for the cellular base station 110) can re-open any previously unsafe channels that are now safe for use.

Figure 2:
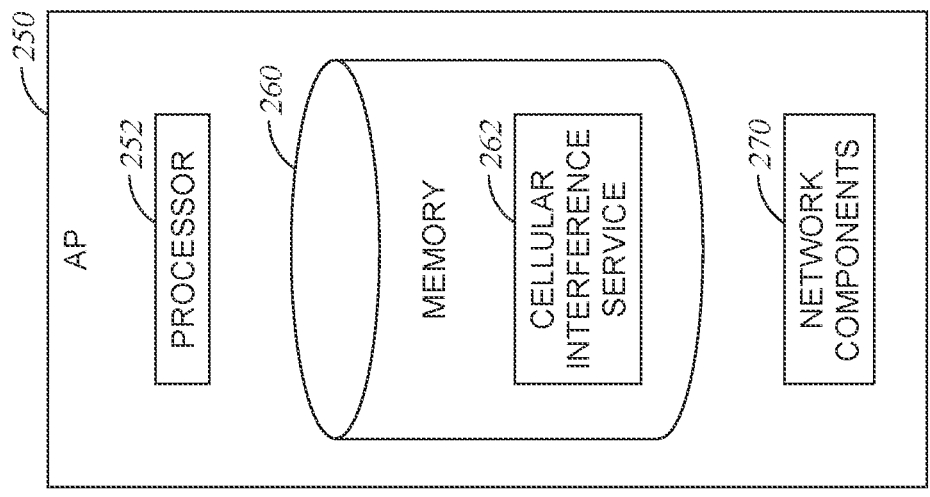
FIG. 2 illustrates an STA and an AP for avoiding cellular coexistence interference in a WiFi network, according to one embodiment.
Figure 2:
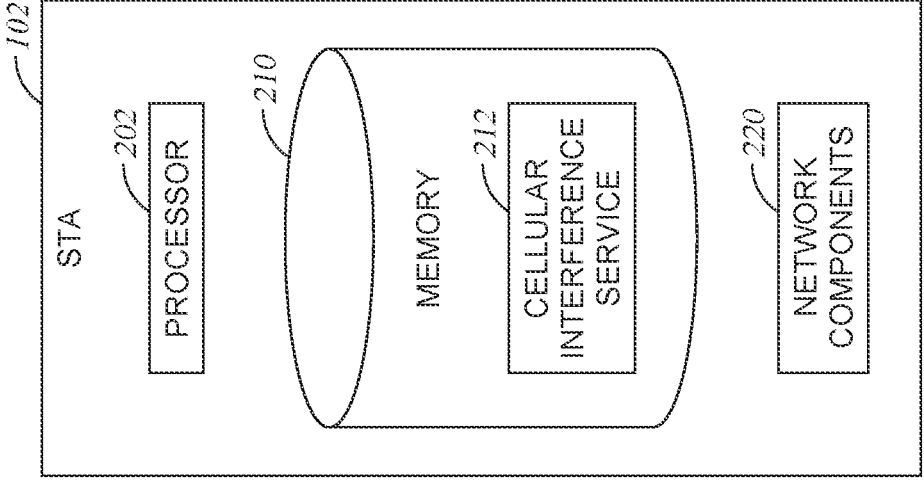

FIG. 2 illustrates an STA 102 and an AP 250 for avoiding cellular coexistence interference in a WiFi network, according to one embodiment. In an embodiment, the AP 250 corresponds with any of the APs 124A-N illustrated in FIG. 1. The STA 102 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the STA 102 to interface with one or more wireless communication networks, as discussed above in relation to FIG. 1. For example, the network components 220 can include WiFi or cellular network interface components and associated software.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the STA 102. The program code is generally described as various functional "applications" or "modules" within the memory 210, although alternate implementations may have different functions and/or combinations of functions. Within the memory 210, a cellular interference service 212 facilitates identifying and reporting unsafe WiFi channels, as discussed below in relation to FIGS. 3-5.

The AP 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the AP 250 to interface with a wireless communication network, as discussed above in relation to FIG. 1. For example, the network components 270 can include WiFi or cellular network interface components and associated software.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the AP 250. The program code is generally described as various functional "applications" or "modules" within the memory 260, although alternate implementations may have different functions and/or combinations of functions. Within the memory 260, a cellular interference service 262 facilitates reducing cellular interference with unsafe WiFi channels, as discussed below in relation to FIGS. 3-5.

Figure 3:
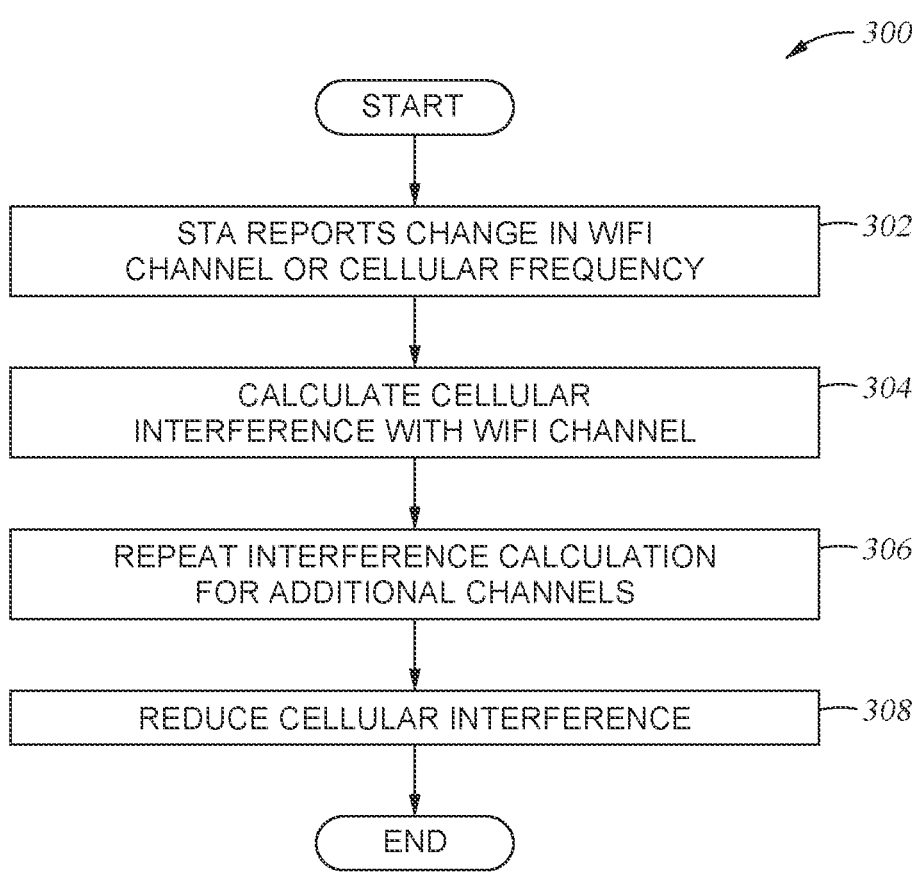
FIG. 3 is a flowchart illustrating avoiding cellular coexistence interference in a WiFi network, according to one embodiment.

FIG. 3 is a flowchart 300 illustrating avoiding cellular coexistence interference in a WiFi network, according to one embodiment. At block 302 a cellular interference service (e.g., the cellular interference service 212 illustrated in FIG. 2) at an STA (e.g., the STA 102 illustrated in FIGS. 1-2) reports a change in WiFi channel or cellular frequency. In an embodiment, when the STA is connected to a new AP (e.g., operating on a different channel from any previous AP connection) or a cellular base station (e.g., the cellular base station 110 illustrated in FIG. 1) has changed its channel (e.g., to use NR-U spectrum), the STA reports the change (e.g., to an AP). For example, the STA can use a coex channel interference avoidance function (CCIA) to report the change.

At block 304, the cellular interference service calculates cellular interference with a WiFi channel. For example, any suitable CCIA technique can be used to calculate the interference between cellular transmission and a WiFi channel currently in use.

At block 306, the cellular interference service repeats the interference calculation for addition WiFi channels. In an embodiment, as discussed above in relation to block 304, CCIA techniques can be used to calculate cellular interference with a WiFi channel in use. The STA can use data in a neighbor table (e.g., computed using channel discovery processes) and repeat the calculation for each channel where an Wi-Fi AP was detected for the same service set identifier (SSID) as the AP with which the STA is associated. The STA thus determines a set of Wi-Fi channels that are unsafe (e.g., due to cellular interference).

At block 308, the cellular interference service at the STA and a cellular interference service at an AP (e.g., the cellular interference service 262 illustrated in FIG. 2) or another WiFi network component, reduce cellular interference. For example, the STA can report unsafe channels to the AP using a suitable network message and the AP can modify WiFi network operation (e.g., modify one or more WiFi radio parameters) to avoid using the unsafe channels. This can be done using any number of suitable techniques, as discussed further below with regard to FIGS. 4A-D.

In an embodiment, an AP periodically collects unsafe channel reports from the STAs. Later, if, or when, cellular channels are changed, the detection of that change on the STA can be used to trigger an unsolicited report. The previously affected channels can then be marked as safe (e.g., using an unsafe channel report) or can be removed from the non-preferred/collision lists. Further, in an embodiment, where a cellular system (e.g., a 5G NR-U system) belongs to the same enterprise as the WiFi deployment, and both Wi-Fi and cellular systems are under the same management system, the management infrastructure can instruct the NR-U to move to another channel to avoid interference at an STA.

Figure 4A:
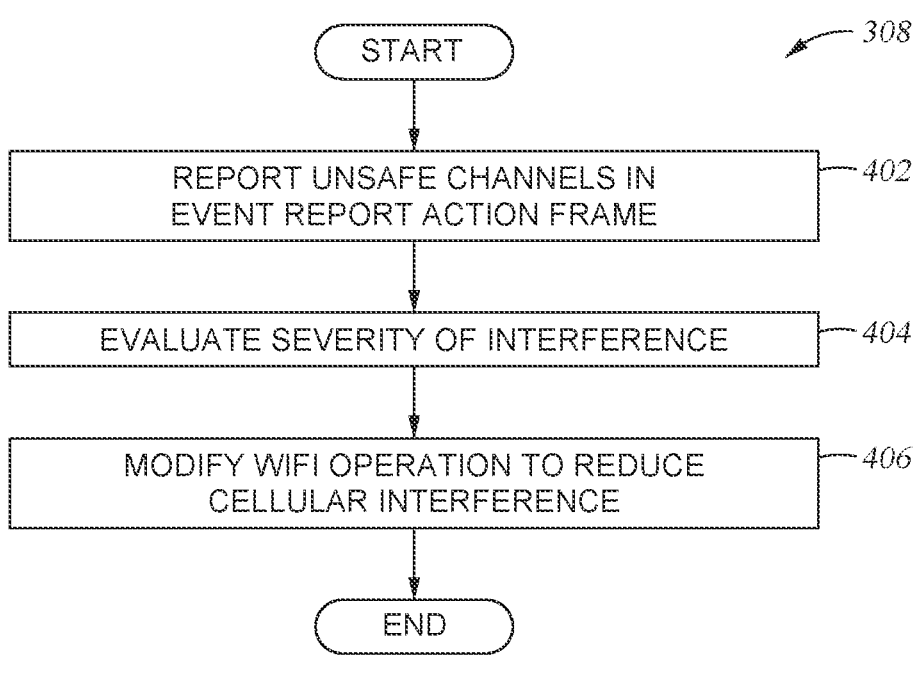
FIG. 4A is a flowchart illustrating a technique for reducing cellular interference at a WiFi network, according to one embodiment.

FIG. 4A is a flowchart illustrating a technique for reducing cellular interference at a WiFi network, according to one embodiment. In an embodiment, FIG. 4A illustrates one example technique corresponding to block 308 illustrated in FIG. 3.

At block 402, a cellular interference service (e.g., the cellular interference service 212 illustrated in FIG. 2) reports unsafe channels in an event report action frame. In an embodiment, an STA creates a new event report action frame containing the list of unsafe channels. A new event type (e.g. a type 6) can be used for the unsafe Wi-Fi channel reporting. The STA can transmit this report unsolicited, or as a result of an AP query (e.g. query to report on detected APs). The AP query can be an 11 k beacon report, an unsafe channel report query, or any other suitable query.

At block 404, a cellular interference service at an AP (e.g., the cellular interference service 262 illustrated in FIG. 2), or another suitable WiFi component, evaluates the severity of the interference. In an embodiment, the AP receives the set of unsafe channels causing interference at the STA. The set may include the AP active channel (e.g., the channel to which the STA is associated), an AP other channel (e.g., a channel for another radio on the same AP), or other channels.

In one embodiment, the AP operates independently (e.g., without a controller) and evaluates the severity of the interference reported (e.g., as expressed in the report). Alternatively, in a controller-based environment, the AP forwards this report to a WLC (e.g., the WLC 122 illustrated in FIG. 1). The WLC can then evaluate the severity of the interference, based on the report.

At block 406, the cellular interference service modifies WiFi operation to reduce cellular interference. In an embodiment, an AP operating without a controller can evaluate a count of clients that may be, or are affected, and can then uses this information to decide to move to another, non-affected, channel. For example, if a threshold number, or fraction, of STAs are experience sufficient interference the AP can modify operation to move to a safe channel for WiFi communication.

Alternatively, or in addition, the AP can operation with a controller (e.g., the WLC). The WLC can use a list of AP neighbors and their client reports as an additional feed source into radio resource management (RRM) and Event-Driven Radio Resource Management (EDRRM) algorithms. For example, affected channels reported with larger severity by a larger client count are assigned a heavier avoidance weight in the algorithm. In some circumstances, the knowledge of affected channels is used to decide which radios can be used together on a given STA, thereby avoiding neighboring APs whose channels are on an unsafe channel.

Figure 4B:
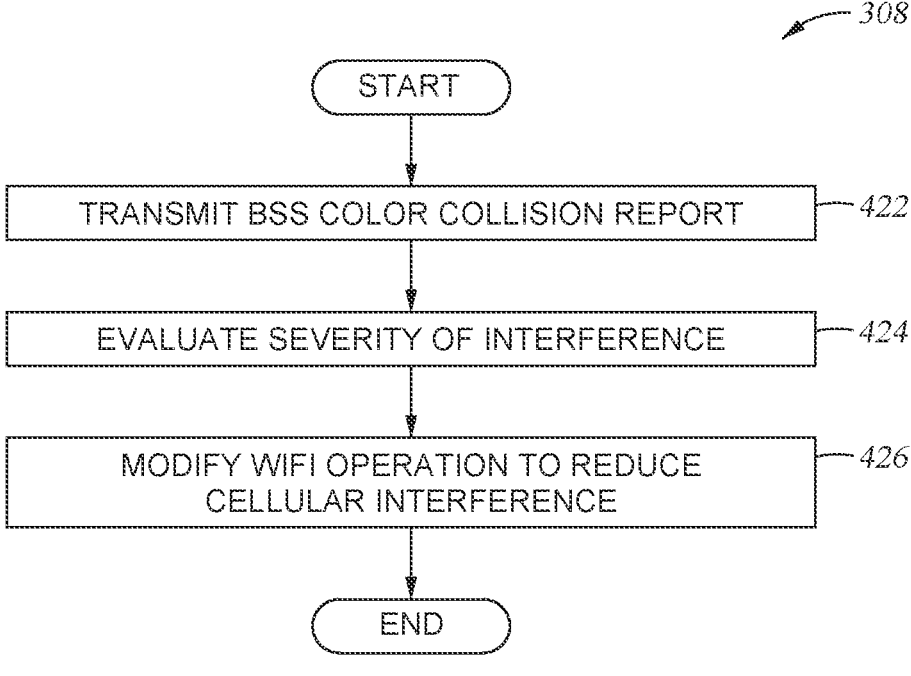
FIG. 4B is a flowchart illustrating a second technique for reducing cellular interference at a WiFi network, according to one embodiment.

FIG. 4B is a flowchart illustrating a second technique for reducing cellular interference at a WiFi network, according to one embodiment. In an embodiment, FIG. 4B illustrates a second example technique corresponding to block 308 illustrated in FIG. 3.

At block 422, a cellular interference service (e.g., the cellular interference service 212 illustrated in FIG. 2) transmits a basic service set (BSS) color collision report. In another embodiment, reporting of unsafe channels as described above in relation to FIG. 4A is not supported. In this embodiment, the STA sends a BSS color collision report. For example, a specific color value may be reserved for a non-Wi-Fi, unresolvable BSS collision value.

At block 424, a cellular interference service at an AP (e.g., the cellular interference service 262 illustrated in FIG. 2), or another suitable WiFi component, evaluates the severity of the interference. In an embodiment, this is similar to block 404 described above in relation to FIG. 4A. The AP, operating either independently or using a controller, evaluates the severity of reported interference.

At block 426, the cellular interference service modifies WiFi operation to reduce cellular interference. In an embodiment, this is similar to block 406 described above in relation to FIG. 4A. For example, an AP operating without a controller can evaluate a count of clients that may be, or are affected by cellular interference, and can then use this information to decide to move to another, non-affected, channel. Alternatively, or in addition, the AP can operation with a controller (e.g., the WLC). The WLC can use a list of AP neighbors and their client reports as an additional feed source into RRM and EDRRM algorithms.

Figure 4C:
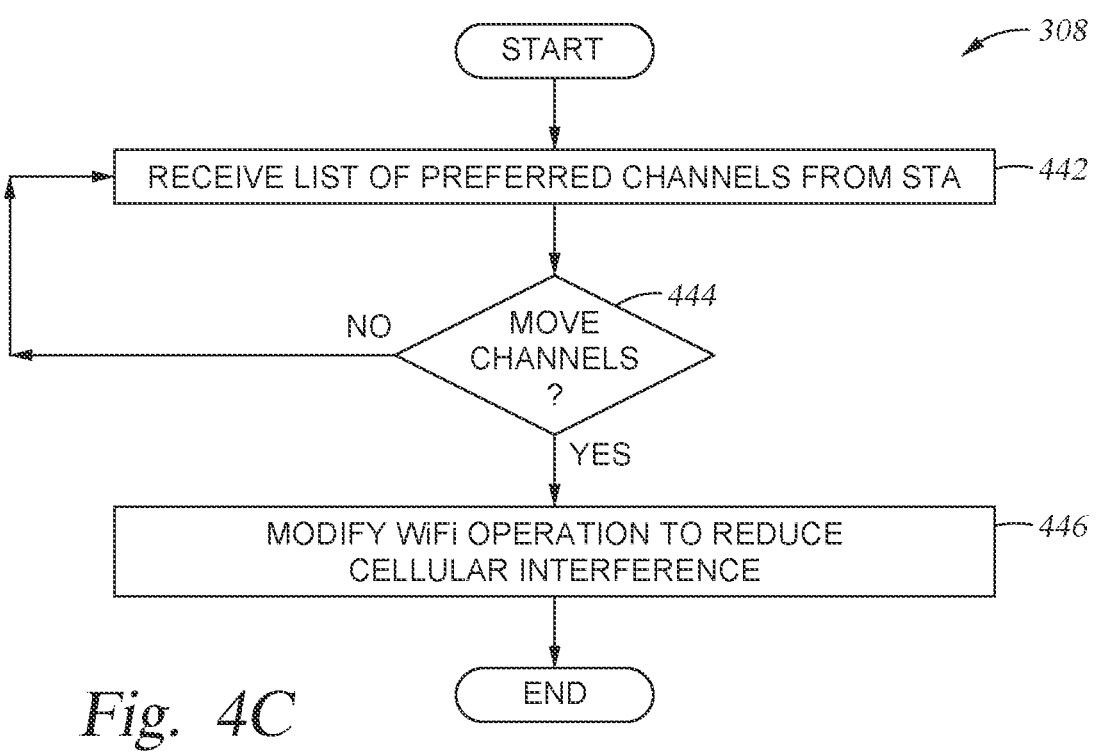
FIG. 4C is a flowchart illustrating a third technique for reducing cellular interference at a WiFi network, according to one embodiment.

FIG. 4C is a flowchart illustrating a third technique for reducing cellular interference at a WiFi network, according to one embodiment. In an embodiment, FIG. 4C illustrates a third example technique corresponding to block 308 illustrated in FIG. 3.

At block 442, a cellular interference service (e.g., the cellular interference service 262 illustrated in FIG. 2) at an AP, or another suitable WiFi component, receives a list of preferred channels from the STA. In an embodiment, the STA sends to the AP a list of preferred channels. This list can be solicited (e.g., based on a query from the AP) or unsolicited. Further, in an embodiment the list excludes the channels affected by cellular interference. In one embodiment, a flag is used to signal that unspecified channels are not usable by the STA. This is merely an example, and a flag is not required.

At block 444, the cellular interference service determines whether to move channels. For example, the AP, WLC, or other suitable WiFi component can determine how many STAs have provided a list of preferred channels that excludes a particular unsafe channel that is currently in use. If a sufficient number, or fraction, or STAs have reported preferred channels avoiding the unsafe channel, the flow proceeds to block 446.

At block 446, the cellular interference service modifies WiFi operation to reduce cellular interference. For example, the cellular interference service can move channels away from the channel in use to one of the preferred channels. Returning to block 444, if the cellular interference service determines not to move channels the flow returns to block 442.

Figure 4D:
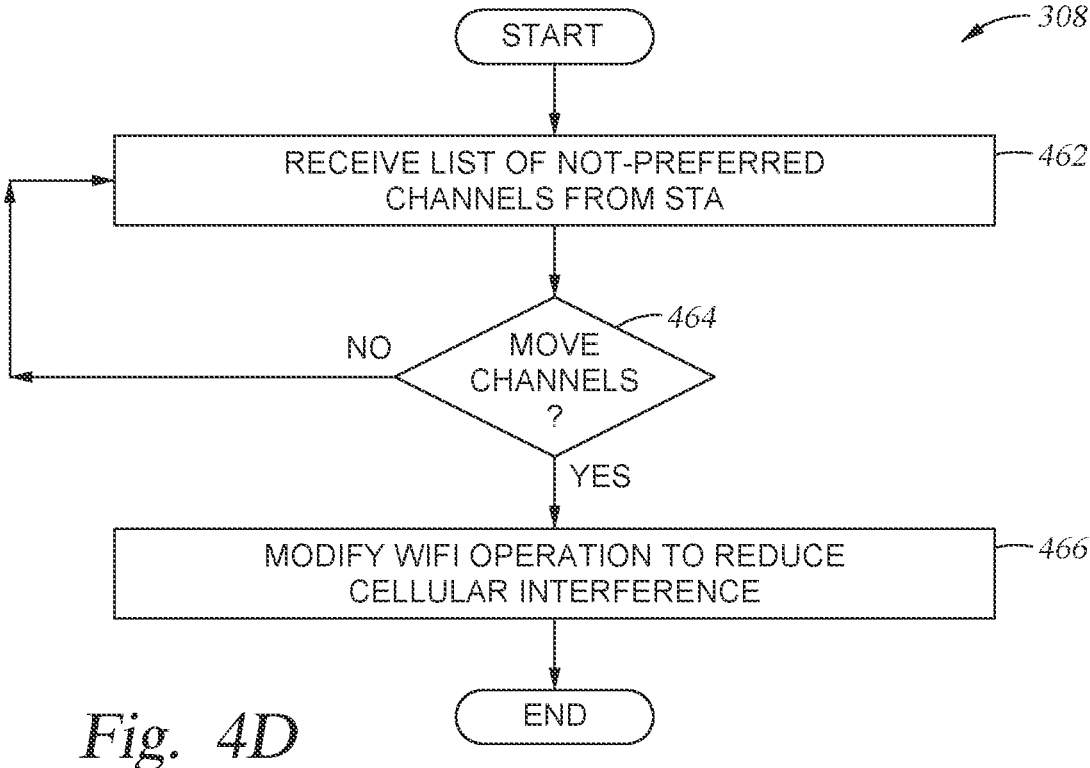
FIG. 4D is a flowchart illustrating a fourth technique for reducing cellular interference at a WiFi network, according to one embodiment.

FIG. 4D is a flowchart illustrating a fourth technique for reducing cellular interference at a WiFi network, according to one embodiment. In an embodiment, FIG. 4D illustrates a fourth example technique corresponding to block 308 illustrated in FIG. 3.

At block 462, a cellular interference service (e.g., the cellular interference service 262 illustrated in FIG. 2) at an AP, or another suitable WiFi component, receives a list of not-preferred channels from the STA. In an embodiment, the STA sends to the AP a list of not-preferred channels. This list can be solicited (e.g., based on a query from the AP) or unsolicited. Further, in an embodiment the list includes the channels affected by cellular interference. In one embodiment, a flag is used to signal that the specified channels are not usable by the STA. This is merely an example, and a flag is not required.

At block 464, the cellular interference service determines whether to move channels. For example, the AP, WLC, or other suitable WiFi component can determine how many STAs have provided a list of not-preferred channels that includes a particular channel that is currently in use. If a sufficient number, or fraction, or STAs have reported not-preferred channels including the channel in use, the flow proceeds to block 466.

At block 466, the cellular interference service modifies WiFi operation to reduce cellular interference. For example, the cellular interference service can move channels away from the channel in use to another channel that is not included in the not-preferred channel list. Returning to block 464, if the cellular interference service determines not to move channels the flow returns to block 462.

Figure 5:
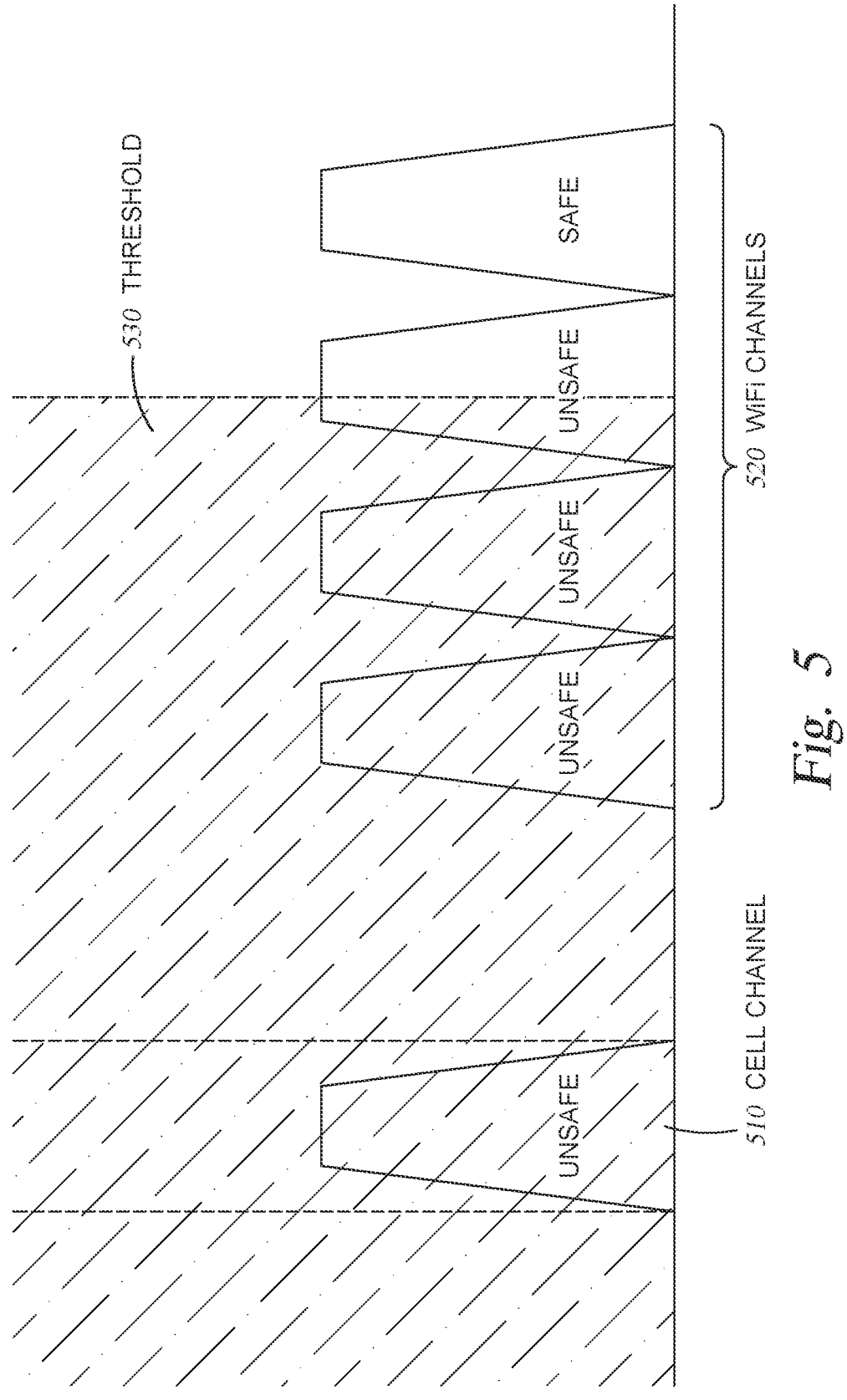
FIG. 5 illustrates cellular interference with a WiFi network, according to one embodiment.

FIG. 5 illustrates cellular interference with a WiFi network, according to one embodiment. In an embodiment, cellular channels 510 and WiFi channels 520 are each in use for an STA. The cellular channels 510 can interfere with the WiFi channels 520. This can occur when the cellular channels 510 and Wi-Fi channels 520 are within short frequency separation (e.g., neighboring channels) or when there is harmonic and intermodulation interference. This is merely an example. Further, a threshold 530 can be used to identify when interference is sufficient to modify WiFi operation. This is discussed further, above, in relation to FIGS. 4A-D.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   identifying, by an access point (AP), a change in at least one of: (i) a WiFi radio channel or (ii) a cellular radio channel for a wireless station (STA) supporting both WiFi and cellular radio access technologies;
   determining, by the AP, one or more WiFi radio channels subject to interference from the cellular radio for the STA, based on a network message received from the STA, wherein the network message comprises an event report action frame that identifies the one or more WiFi radio channels subject to interference; and modifying, by the AP, one or more parameters for WiFi communication relating to the STA, based on the determined one or more WiFi radio channels subject to interference.

2. The method of claim 1, wherein the one or more WiFi radio channels comprises a plurality of WiFi radio channels, including a first channel in active use for the STA and a first wireless access point (AP) and a second channel not in active use for the STA and the first AP.

3. The method of claim 2, wherein the STA calculates the plurality of WiFi radio channels based on identifying the second channel as relating to a second AP associated with a same service set identifier (SSID) as the first AP.

4. The method of claim 1, wherein the network message received from the STA comprises a basic service set (BSS) color collision report.

5. The method of claim 1,
   wherein the network message received from the STA comprises a list of one or more preferred WiFi channels, and
   wherein the determining the one or more WiFi radio channels subject to interference from the cellular radio for the STA is based on the list of one or more preferred WiFi channels.

6. The method of claim 1,
   wherein the network message received from the STA comprises a list of one or more not-preferred WiFi channels, and
   wherein the determining the one or more WiFi radio channels subject to interference from the cellular radio for the STA is based on the list of one or more not-preferred WiFi channels.

7. The method of claim 1, wherein modifying one or more parameters for WiFi communication relating to the STA, based on the determined one or more WiFi radio channels subject to interference comprises:
   determining a number of STAs for which the one or more WiFi radio channels are subject to interference; and
   modifying the one or more parameters based on the determined number of STAs.

8. The method of claim 1, wherein modifying one or more parameters for WiFi communication relating to the STA, based on the determined one or more WiFi radio channels subject to interference comprises:
   determining, at a wireless access point (AP) associated with the STA, to change active WiFi channels to reduce cellular interference.

9. The method of claim 1, wherein modifying one or more parameters for WiFi communication relating to the STA, based on the determined one or more WiFi radio channels subject to interference comprises:
   using data relating to the determined one or more WiFi radio channels subject to interference for radio resource management (RRM) at a wireless controller associated with the STA.

10. A system, comprising:
   a processor; and
   a memory having instructions stored thereon which, when executed on the processor, performs operations comprising:
      identifying a change in at least one of: (i) a WiFi radio channel or (ii) a cellular radio channel for a wireless station (STA) supporting both WiFi and cellular radio access technologies;
      determining one or more WiFi radio channels subject to interference from the cellular radio for the STA, based on a network message received from the STA, wherein the network message comprises a list relating to preferred WiFi channels, and wherein determining the one or more WiFi radio channels subject to interference is based on the list; and modifying one or more parameters for WiFi communication relating to the STA, based on the determined one or more WiFi radio channels subject to interference.

11. The system of claim 10, wherein the one or more WiFi radio channels comprises a plurality of WiFi radio channels, including a first channel in active use for the STA and a first wireless access point (AP) and a second channel not in active use for the STA and the first AP.

12. The system of claim 10, wherein the network message received from the STA comprises at least one of: (i) an event report action frame or (ii) a basic service set (BSS) color collision report.

13. The system of claim 10, wherein modifying one or more parameters for WiFi communication relating to the STA, based on the determined one or more WiFi radio channels subject to interference comprises:

determining a number of STAs for which the one or more WiFi radio channels are subject to interference; and modifying the one or more parameters based on the determined number of STAs.

14. A non-transitory computer-readable medium having instructions stored thereon which, when executed by a processor, performs operations comprising:

identifying a change in at least one of: (i) a WiFi radio channel or (ii) a cellular radio channel for a wireless station (STA) supporting both WiFi and cellular radio access technologies;

determining one or more WiFi radio channels subject to interference from the cellular radio for the STA, based on a network message received from the STA;

determining a number of STAs for which the one or more WiFi radio channels are subject to interference; and modifying one or more parameters for WiFi communication relating to the STA, based on the determined one or more WiFi radio channels subject to interference and the determined number of STAs.

15. The non-transitory computer-readable medium of claim 14, wherein the one or more WiFi radio channels comprises a plurality of WiFi radio channels, including a first channel in active use for the STA and a first wireless access point (AP) and a second channel not in active use for the STA and the first AP.

16. The non-transitory computer-readable medium of claim 14, wherein the network message received from the STA comprises at least one of: (i) an event report action frame or (ii) a basic service set (BSS) color collision report.

17. The non-transitory computer-readable medium of claim 14, wherein the network message received from the STA comprises a list relating to preferred WiFi channels, and wherein the determining the one or more WiFi radio channels subject to interference from the cellular radio for the STA is based on the list.

* * * * *